United States Patent
Murakami et al.

(10) Patent No.: US 11,283,953 B2
(45) Date of Patent: Mar. 22, 2022

(54) IMAGE READING APPARATUS FOR GENERATING A CUTOUT IMAGE FROM INPUT IMAGE

(71) Applicant: PFU LIMITED, Kahoku (JP)

(72) Inventors: Tomohiro Murakami, Kahoku (JP); Hiroyuki Kitano, Kahoku (JP)

(73) Assignee: PFU LIMITED, Kahoku (JP)

( * ) Notice: Subject to any disclaimer, the term of this patent is extended or adjusted under 35 U.S.C. 154(b) by 0 days.

(21) Appl. No.: 16/854,727

(22) Filed: Apr. 21, 2020

(65) Prior Publication Data

US 2020/0382671 A1    Dec. 3, 2020

(30) Foreign Application Priority Data

May 31, 2019  (JP) .............................. JP2019-102760

(51) Int. Cl.
*H04N 1/00*  (2006.01)
*G06F 3/12*   (2006.01)

(52) U.S. Cl.
CPC ..... *H04N 1/00718* (2013.01); *H04N 1/00705* (2013.01); *H04N 1/00729* (2013.01); *H04N 1/00745* (2013.01)

(58) Field of Classification Search
CPC ........... H04N 1/00705; H04N 1/00718; H04N 1/00729; H04N 1/00745; H04N 1/00628; H04N 1/3878
USPC ................ 358/1.2, 488, 448, 464, 463, 462; 382/289, 286
See application file for complete search history.

(56) References Cited

U.S. PATENT DOCUMENTS

| 9,848,104 B1 * | 12/2017 | Wada ................. H04N 1/00718 |
| 2011/0279840 A1 * | 11/2011 | Iwayama ........... H04N 1/00588 358/1.12 |
| 2013/0083366 A1 * | 4/2013 | Motoyama ......... H04N 1/00745 358/448 |
| 2014/0078558 A1 * | 3/2014 | Kanaya .............. H04N 1/00005 358/448 |
| 2014/0079460 A1 * | 3/2014 | Kanaya .................... H04N 1/04 400/583 |

FOREIGN PATENT DOCUMENTS

| JP | 2008-214046 A | 9/2008 |
| JP | 2013-77953 A | 4/2013 |

* cited by examiner

*Primary Examiner* — Chad Dickerson
(74) *Attorney, Agent, or Firm* — Lewis Roca Rothgerber Christie LLP

(57) ABSTRACT

The image reading apparatus includes a separation roller, an imaging device to generate an input image, a conveyance roller to convey the medium separated by the separation roller to the imaging device, a first medium sensor located between the separation roller and the conveyance roller, a second medium sensor located between the conveyance roller and the imaging device, a processor to start imaging by the imaging device in response to detection of the medium by the first medium sensor and generate a cutout image from the input image in response to detection of the medium by the second medium sensor, and an output device to output the cutout image. The processor generates the cutout image based on a position imaged by a predetermined amount before a position imaged at a timing when the second medium sensor detects the medium, in the input image.

12 Claims, 11 Drawing Sheets

IMAGE READING APPARATUS FOR GENERATING A CUTOUT IMAGE FROM INPUT IMAGE

CROSS-REFERENCE TO RELATED APPLICATIONS

This application is based upon and claims the benefit of priority of prior Japanese Patent Application No. 2019-102760, filed on May 31, 2019, the entire contents of which are incorporated herein by reference.

TECHNICAL FIELD

Embodiments discussed in the present specification relate to image processing.

BACKGROUND

In an image reading apparatus, such as a scanner, for conveying and imaging a medium such as a document, a skew (oblique movement) being a phenomenon in which a medium is conveyed in a tilted manner may occur when the medium is conveyed, resulting in one corner part of the front edge of the medium reaching an imaging device much earlier than the other part. In order to reliably image the entire medium even in such a case, the image reading apparatus needs to start imaging simultaneously with a start of conveyance of the medium. However, when slipping of the medium occurs during conveyance, an image in which the medium is imaged includes a large blank part in which the medium is not imaged and when image processing such as character detection is performed on the image, the processing load increases.

An image reading apparatus that starts reading a document by use of a CIS when a first step count is counted after the document passes a position of a sensor located at a position on the upstream side of the CIS on a conveyance path is disclosed (see Japanese Unexamined Patent Publication (Kokai) No. 2013-77953).

SUMMARY

According to some embodiments, an image reading apparatus includes a separation roller to separate a medium, an imaging device to image the medium to generate an input image, a conveyance roller to convey the medium separated by the separation roller to the imaging device, a first medium sensor located between the separation roller and the conveyance roller, a second medium sensor located between the conveyance roller and the imaging device, a processor to start imaging by the imaging device in response to detection of the medium by the first medium sensor and generate a cutout image from the input image in response to detection of the medium by the second medium sensor, and an output device to output the cutout image. The processor generates the cutout image based on a position imaged by a predetermined amount before a position imaged at a timing when the second medium sensor detects the medium, in the input image.

According to some embodiments, a method for generating a cutout image includes separating a medium by a separation roller, conveying the medium separated by the separation roller to an imaging device by a conveyance roller, starting imaging the medium to generate an input image by the imaging device in response to detection of the medium by a first medium sensor located between the separation roller and the conveyance roller, generating a cutout image from the input image in response to detection of the medium by the second medium sensor located between the conveyance roller and the imaging device, and outputting the cutout image by the output device. The cutout image is generated based on a position imaged by a predetermined amount before a position imaged at a timing when the second medium sensor detects the medium, in the input image.

According to some embodiments, a computer program causes an image reading apparatus including a separation roller to separate a medium, an imaging device to image the medium to generate an input image, a conveyance roller to convey the medium separated by the separation roller to the imaging device, a first medium sensor located between the separation roller and the conveyance roller, a second medium sensor located between the conveyance roller and the imaging device, to execute a process including starting imaging by the imaging device in response to detection of the medium by the first medium sensor and generating a cutout image from the input image in response to detection of the medium by the second medium sensor, and outputting the cutout image. The cutout image is generated based on a position imaged by a predetermined amount before a position imaged at a timing when the second medium sensor detects the medium, in the input image.

DESCRIPTION OF EMBODIMENTS

It is to be understood that both the foregoing general description and the following detailed description are exemplary and explanatory, and are not restrictive of the invention, as claimed.

Hereinafter, an image reading apparatus, a method for generating a cutout image and a computer-readable, non-transitory medium storing a computer program according to an embodiment, will be described with reference to the drawings. However, it should be noted that the technical scope of the invention is not limited to these embodiments, and extends to the inventions described in the claims and their equivalents.

Figure 1:
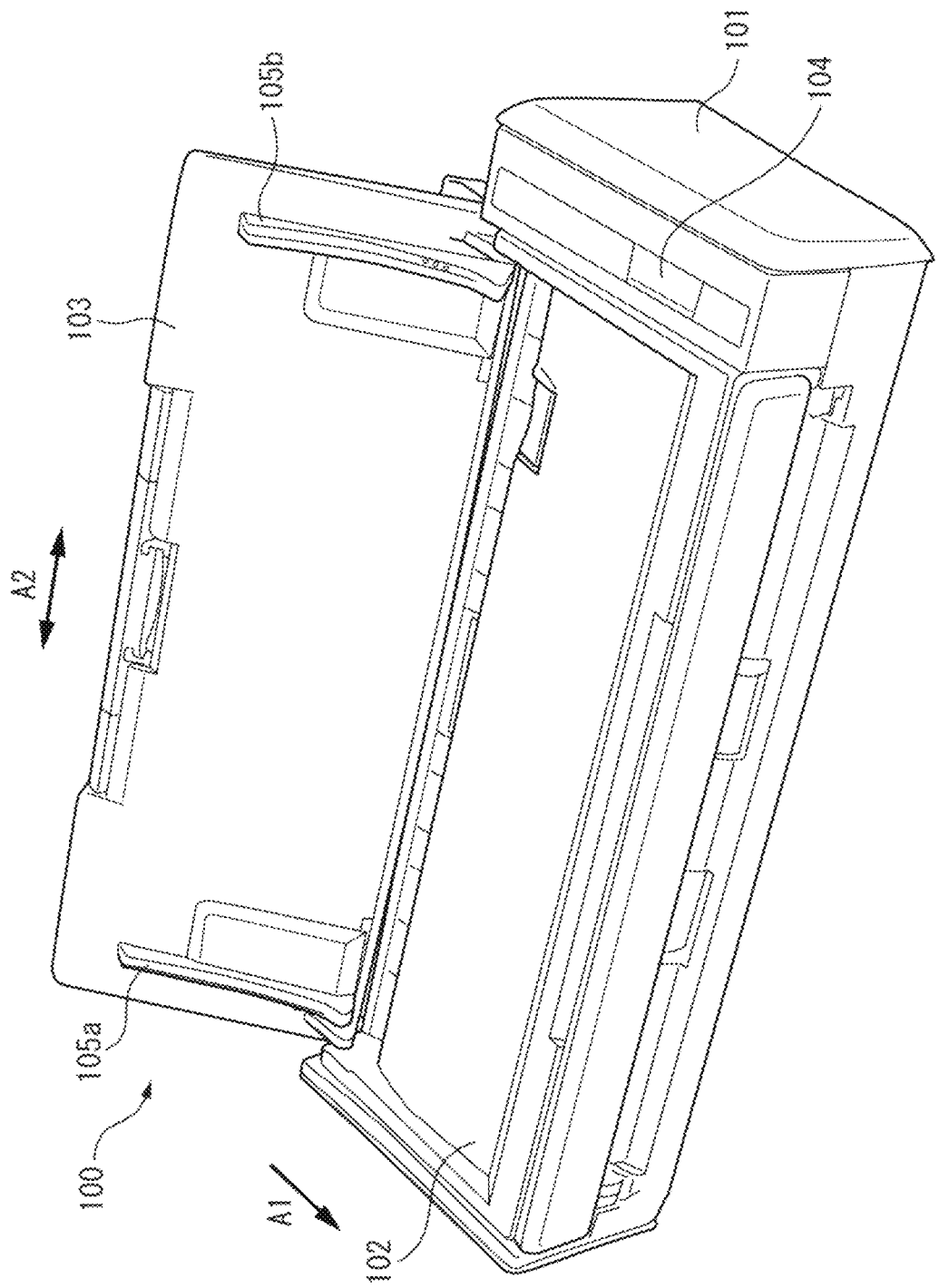
FIG. 1 is a perspective view illustrating an image reading apparatus 100 according to an embodiment.

FIG. 1 is a perspective view illustrating a medium conveying apparatus 100 configured as an image scanner. The medium conveying apparatus 100 conveys and images a medium being a document. A medium is paper, thick paper, a card, a brochure, a passport, etc. The medium conveying apparatus 100 may be a fax machine, a copying machine, a multifunctional peripheral (MFP), etc.

The medium conveying apparatus 100 includes a lower housing 101, an upper housing 102, a medium tray 103, and an operation display device 104, etc.

The upper housing 102 is located in a position covering a top surface of the medium conveying apparatus 100, and is engaged with the lower housing 101 by a hinge in such a way as to be able to open and close in a case of a medium being stuck, cleaning inside the medium conveying apparatus 100, etc.

The medium tray 103 is engaged with the lower housing 101 in such a way as to be able to place a medium to be conveyed. The medium tray 103 includes side guides 105a and b. The side guides 105a and b are provided to be movable in a width direction A2 orthogonal to a medium conveying direction A1 of the medium tray 103 and also regulate a width direction of a medium placed on the medium tray 103.

The operation display device 104 includes an input device such as a button and an interface circuit for acquiring a signal from the input device, receives an input operation by a user, and outputs an operation signal depending on the input operation by the user. The operation display device 104 further includes a display device such as a light emitting diode (LED) and an interface circuit for outputting an instruction signal to the display device, and notifies a user of information such as a warning. The operation display device 104 may include a display including a liquid crystal or organic electro-luminescence (EL), and an interface circuit for outputting image data to the display, and may display the image data on the display.

Figure 2:
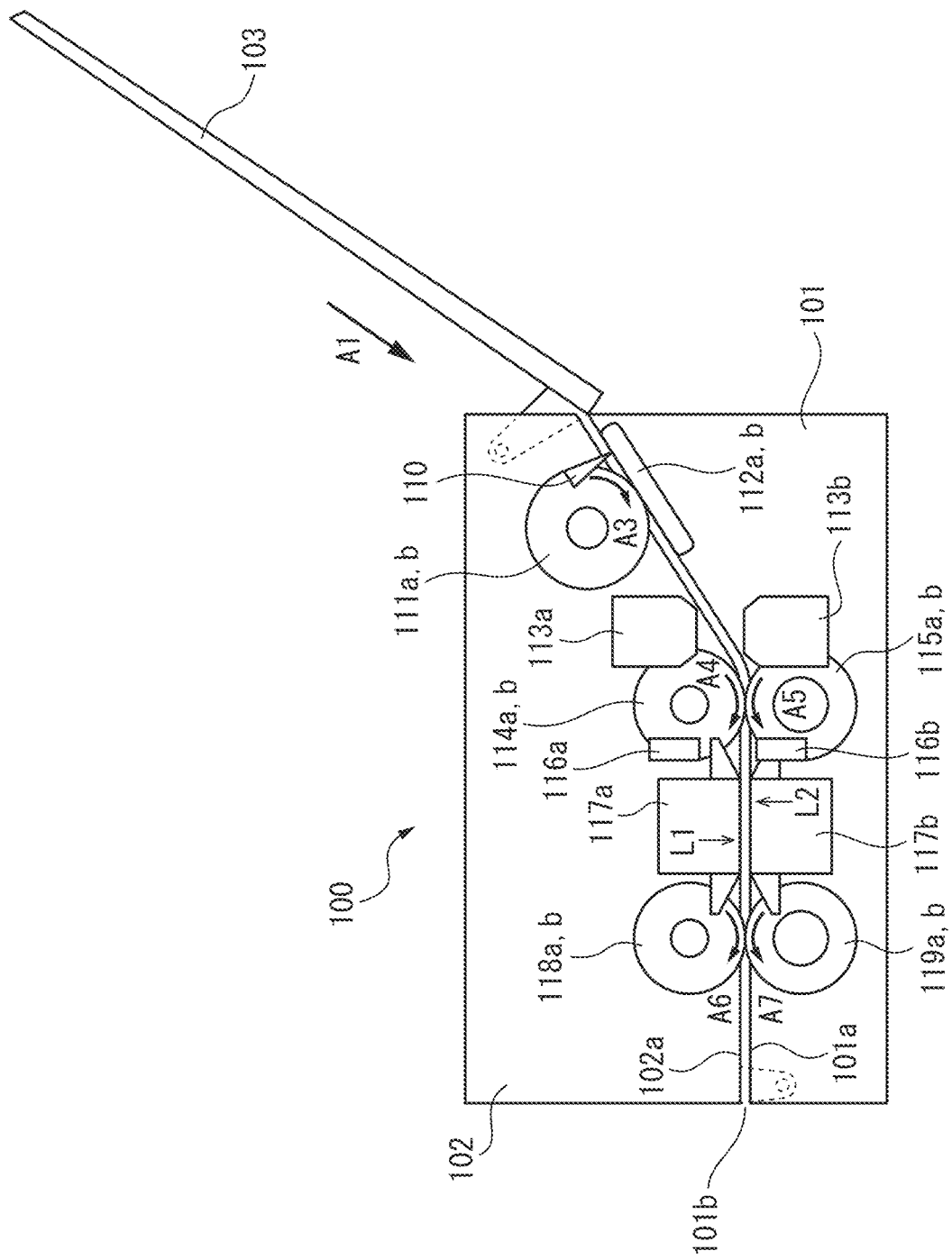
FIG. 2 is a diagram for illustrating a conveyance path inside the image reading apparatus 100.

FIG. 2 is a diagram for illustrating a conveyance path inside the medium conveying apparatus 100.

The conveyance path inside the image reading apparatus 100 includes a contact sensor 110, separation rollers 111a and b, separation pads 112a and b, an ultrasonic transmitter 113a, an ultrasonic receiver 113b, first conveyance rollers 114a and b, second conveyance rollers 115a and b, a light emitter 116a, a light receiver 116b, a first imaging device 117a, a second imaging device 117b, third conveyance rollers 118a and b, and fourth conveyance rollers 119a and b. The number of the respective rollers and pads is not limited to two and may be one or greater than two.

The separation rollers 111a and 111b may be hereinafter collectively referred to as separation rollers 111. Further, the separation pads 112a and 112b may be collectively referred to as separation pads 112. Further, the first conveyance rollers 114a and 114b may be collectively referred to as first conveyance rollers 114. Further, the second conveyance rollers 115a and 115b may be collectively referred to as second conveyance rollers 115. Further, the first imaging device 117a and the second imaging device 117b may be collectively referred to as imaging devices 117. Further, the third conveyance rollers 118a and 118b may be collectively referred to as third conveyance rollers 118. Further, the fourth conveyance rollers 119a and 119b may be collectively referred to as fourth conveyance rollers 119. Further, the first conveyance rollers 114 and the second conveyance rollers 115 may be collectively referred to as conveyance roller pair.

A top surface of the lower housing 101 forms a lower guide 101a of a conveyance path of a medium, and a bottom surface of the upper housing 102 forms an upper guide 102a of the conveyance path of a medium. An arrow A1 in FIG. 2 indicates a medium conveying direction. An upstream hereinafter refers to an upstream in the medium conveying direction A1, and a downstream refers to a downstream in the medium conveying direction A1. Edges of the lower guide 101a and the upper guide 102a on the downstream side form an outlet 101b of a medium.

The contact sensor 110 detects whether or not a medium is placed on the medium tray 103. The contact sensor 110 generates and outputs a contact detection signal a signal value of which changes between a state in which a medium is placed on the medium tray 103 and a state in which a medium is not placed.

The separation rollers 111 and the separation pads 112 are provided on the downstream side of the contact sensor 110 in such a way as to face one another, and separate and feed media placed on the medium tray 103. The separation rollers 111 are provided to be rotatable in a direction of an arrow A3 in FIG. 2 and feed a medium placed on the medium tray 103 toward the medium conveying direction A1. On the other hand, the separation pads 112 prevent feed of a medium not in contact with the separation rollers 111, out of media placed on the medium tray 103. Retard rollers provided to be rotatable in a direction opposite to the medium feeding direction may be used in place of the separation pads 112.

The ultrasonic transmitter 113a and the ultrasonic receiver 113b are located between the separation rollers 111 and the conveyance roller pair in the medium conveying direction A1. The ultrasonic transmitter 113a and the ultrasonic receiver 113b are located close to the conveyance path of a medium in such a way as to face one another with the conveyance path in between. The ultrasonic transmitter 113a transmits an ultrasonic wave. On the other hand, the ultrasonic receiver 113b receives an ultrasonic wave being transmitted by the ultrasonic transmitter 113a and passing through a medium, and generates and outputs an ultrasonic signal being an electric signal corresponding to the received ultrasonic wave. The ultrasonic transmitter 113a and the ultrasonic receiver 113b may be hereinafter collectively referred to as an ultrasonic sensor 113. The ultrasonic sensor 113 is an example of a first medium sensor.

The first conveyance rollers 114 and the second conveyance rollers 115 are provided on the downstream side of the ultrasonic sensor 113 in such a way as to face one another, and convey a medium separated by the separation rollers 111 to the imaging devices 117. The first conveyance roller 114 or the second conveyance roller 115 is an example of a conveyance roller.

The light emitter 116a and the light receiver 116b are located between the conveyance roller pair and the imaging devices 117 in the medium conveying direction A1. The light emitter 116a and the light receiver 116b are located close to the conveyance path of a medium in such a way as to face one another with the conveyance path in between. The light emitter 116a emits light toward the light receiver 116b. When a medium does not exist on the conveyance path, the light receiver 116b detects light emitted from the light emitter 116a. On the other hand, when a medium exists on the conveyance path, light emitted from the light emitter 116a is blocked by the medium existing on the conveyance path, and the light receiver 116b does not detect the light emitted from the light emitter 116a. The light receiver 116b detects whether or not a medium exists between the light emitter 116a and the light receiver 116b depending on intensity of received light, and generates and outputs an optical signal being an electric signal indicating whether or not a medium exists. The light emitter 116a and the light receiver 116b may be hereinafter collectively referred to as an optical sensor 116. The optical sensor 116 is an example of a second medium sensor.

In the optical sensor 116, the light emitter and the light receiver may be provided on one side of the conveyance path of a medium, and a reflection member such as a mirror may be provided at a position facing the light emitter and the light receiver with the conveyance path in between. In that case, the light emitter projects light toward the conveyance path. On the other hand, the light receiver receives light projected by the light emitter and reflected by the reflection member, and generates and outputs an optical signal depending on the intensity of the received light. Further, a contact detection sensor may be used as a second medium sensor in place of the optical sensor 116.

The first imaging device 117a includes a unity-magnification optical system type contact image sensor (CIS) including complementary metal oxide semiconductor (CMOS) based imaging elements linearly located in a main scanning direction. Further, the first imaging device 117a includes a lens for forming an image on the imaging element, and an A/D converter for amplifying and analog-digital (A/D) converting an electric signal output from the imaging element. The first imaging device 117a generates and outputs an input image imaging a front side of a conveyed medium.

Similarly, the second imaging device 117b includes a unity-magnification optical system type CIS including CMOS based imaging elements linearly located in a main scanning direction. Further, the second imaging device 117b includes a lens for forming an image on the imaging element, and an A/D converter for amplifying and analog-digital (A/D) converting an electric signal output from the imaging element. The second imaging device 117b generates and outputs an input image imaging a back side of a conveyed medium.

The imaging device 117 is an example of an imager. The imaging devices 117 image each line extending in the main scanning direction of a medium in accordance with a control pulse causing a motor to rotate and being generated by a pulse generation circuit included in a driving device to be described later. Only either of the first imaging device 117a and the second imaging device 117b may be located in the image reading apparatus 100 and only one side of a medium may be read. Further, a reduction optical system type imaging sensor including an imaging element based on charge coupled devices (CCDs) may be used in place of CIS.

The third conveyance rollers 118 and the fourth conveyance rollers 119 are provided on the downstream side of the imaging devices 117 in such a way as to face one another, and eject a medium conveyed by the first conveyance rollers 114 and the second conveyance rollers 115 from the outlet 101b.

A medium placed on the medium tray 103 is conveyed between the lower guide 101a and the upper guide 102a in the medium conveying direction A1 by the separation rollers 111 rotating in a direction of an arrow A3 in FIG. 2. By the workings of the separation rollers 111 and the separation pads 112, when a plurality of media are placed on the medium tray 103, only a medium in contact with the separation rollers 111, out of the media placed on the medium tray 103, is separated. Consequently, the medium conveying apparatus 100 operates in such a way that conveyance of a medium other than the separated medium is restricted (prevention of media multi-feed).

A medium is fed between the first conveyance rollers 114 and the second conveyance rollers 115 while being guided by the lower guide 101a and the upper guide 102a. The medium is fed between the first imaging device 117a and the second imaging device 117b by the first conveyance rollers 114 and the second conveyance rollers 115 rotating in directions of an arrow A4 and an arrow A5, respectively. The medium is read by the second imaging device 117b at an imaging position L2 and read by the first imaging device 117a at an imaging position L1. Then the medium is ejected from the outlet 101b by the third conveyance rollers 118 and the fourth conveyance rollers 119 rotating in directions of an arrow A6 and an arrow A7, respectively.

Figure 3:
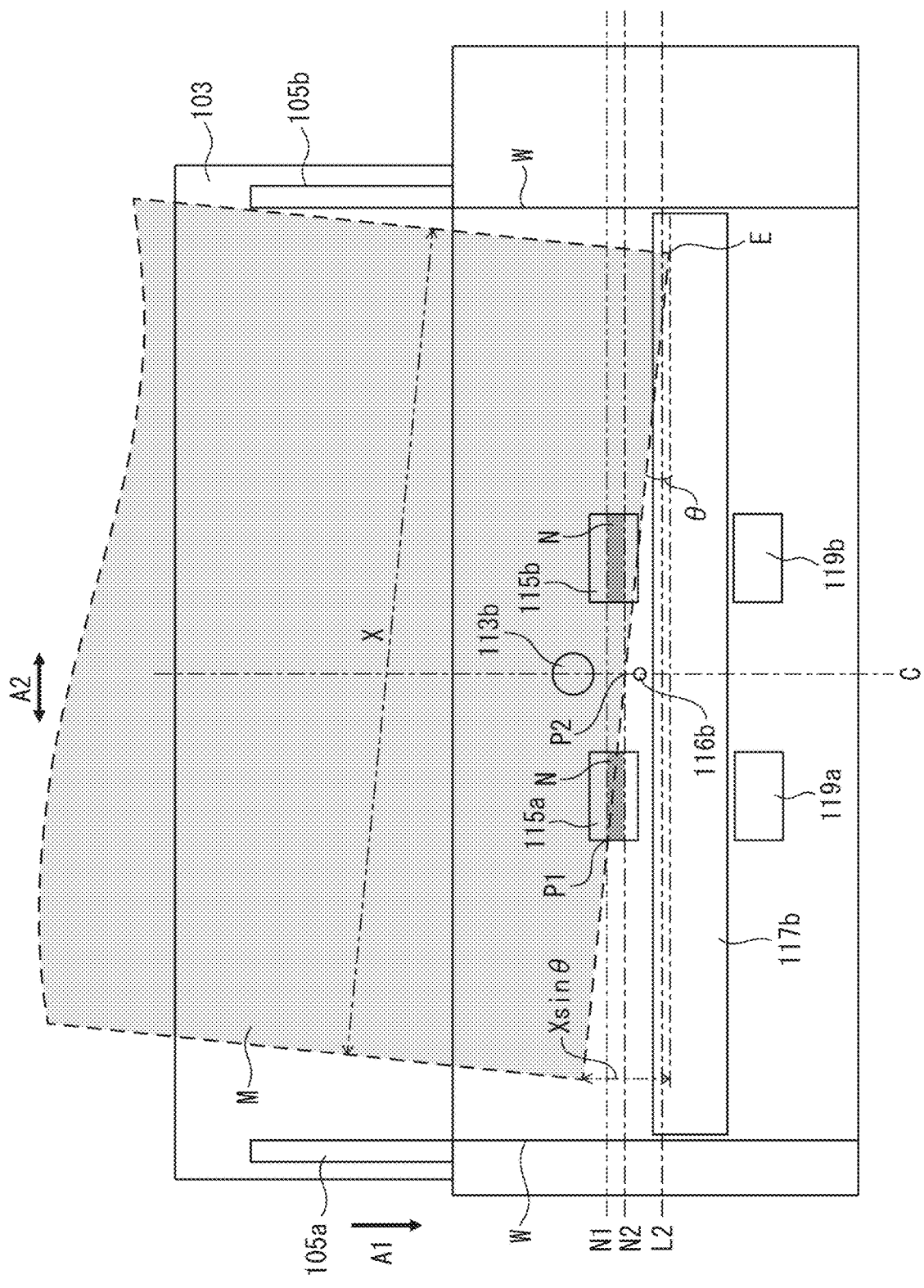
FIG. 3 is a schematic diagram for illustrating an arrangement of a conveyance roller pair, etc.

FIG. 3 is a schematic diagram for illustrating an arrangement of the conveyance roller pair and the imaging devices 117. FIG. 3 is a schematic diagram of the image reading apparatus 100 viewed from above in a state in which the upper housing 102 is removed.

The image reading apparatus 100 is a small-sized device, and as illustrated in FIG. 3, a space between the second conveyance rollers 115 and the second imaging device 117b, that is, a space between the conveyance roller pair and the imaging devices 117, in the medium conveying direction A1, is extremely small. For example, the conveyance roller pair and the imaging devices 117 are located in such a way that a distance between the center position of the conveyance roller pair in the medium conveying direction A1 and L2 being an imaging position of the imaging devices 117 closer to the conveyance roller pair is less than or equal to 20 mm. More preferably, the conveyance roller pair and the imaging devices 117 are located in such a way that the distance is greater than or equal to 10 mm and less than or equal to 15 mm.

In FIG. 3, a range N on the second conveyance rollers 115 indicates a nip range of the conveyance roller pair, and a position N1 indicates an end position of the nip range N on the upstream side and a position N2 indicates an end position of the nip range N on the downstream side. In this example, a straight line passing an end position P1 of the nip range N on the outside (on a side wall W side) and on the upstream side, and a position P2 corresponding to N2 being the end position of the nip range N on the downstream side at the central position C of the medium conveyance path in the width direction A2 overlaps the imaging position L2 of the imaging devices 117. In other words, the imaging devices 117 is located in a range allowing part of a medium clamped by the conveyance roller pair across the full width in the width direction A2 to reach the imaging position L2 before the front edge of the medium passes a range corresponding to the nip range N at the central position C of the conveyance path in the width direction A2.

On the other hand, the ultrasonic sensor 113 is located on the upstream side of N1 being the end position of the nip range N on the upstream side and also close to the central position C of the conveyance path in the width direction A2. Further, the optical sensor 116 is located on the downstream side of N2 being the end position of the nip range N on the downstream side and also close to the central position C of the conveyance path in the width direction A2. Accordingly, in the image reading apparatus 100, the optical sensor 116 is located in such a way that a straight line passing P1 being the end position of the nip range N on the outside and on the upstream side, and the arrangement position of the optical sensor 116 overlaps the imaging position L2 of the imaging devices 117.

Further, as illustrated in FIG. 3, when a size of a medium M in the width direction A2 is denoted as X, and a tilt angle of the medium M relative to the width direction A2 is denoted as $\theta$, an amount of deviation of the front edge of the medium M in the medium conveying direction A1 is (X sin $\theta$). In other words, when a maximum size of a medium supported by the image reading apparatus 100 in the width direction A2 is denoted as $X_{MAX}$, and a permissible amount of tilt of a medium is denoted as $\theta_{MAX}$, the maximum value of an amount of deviation of the front edge of a medium in the medium conveying direction A1 is ($X_{MAX} \sin \theta_{MAX}$). For example, when a maximum size of a medium supported by the image reading apparatus 100 in the width direction A2 is the size of an A4 sheet in a widthwise direction (210 mm), and a permissible amount of tilt of a medium is 3°, the maximum value of an amount of deviation of the front edge of the medium is about 11 mm. In the image reading apparatus 100, the optical sensor 116 is located in such a way that a distance to the imaging position L2 in the medium conveying direction A1 is less than the maximum value of an amount of deviation of the front edge of a medium.

Figure 4:
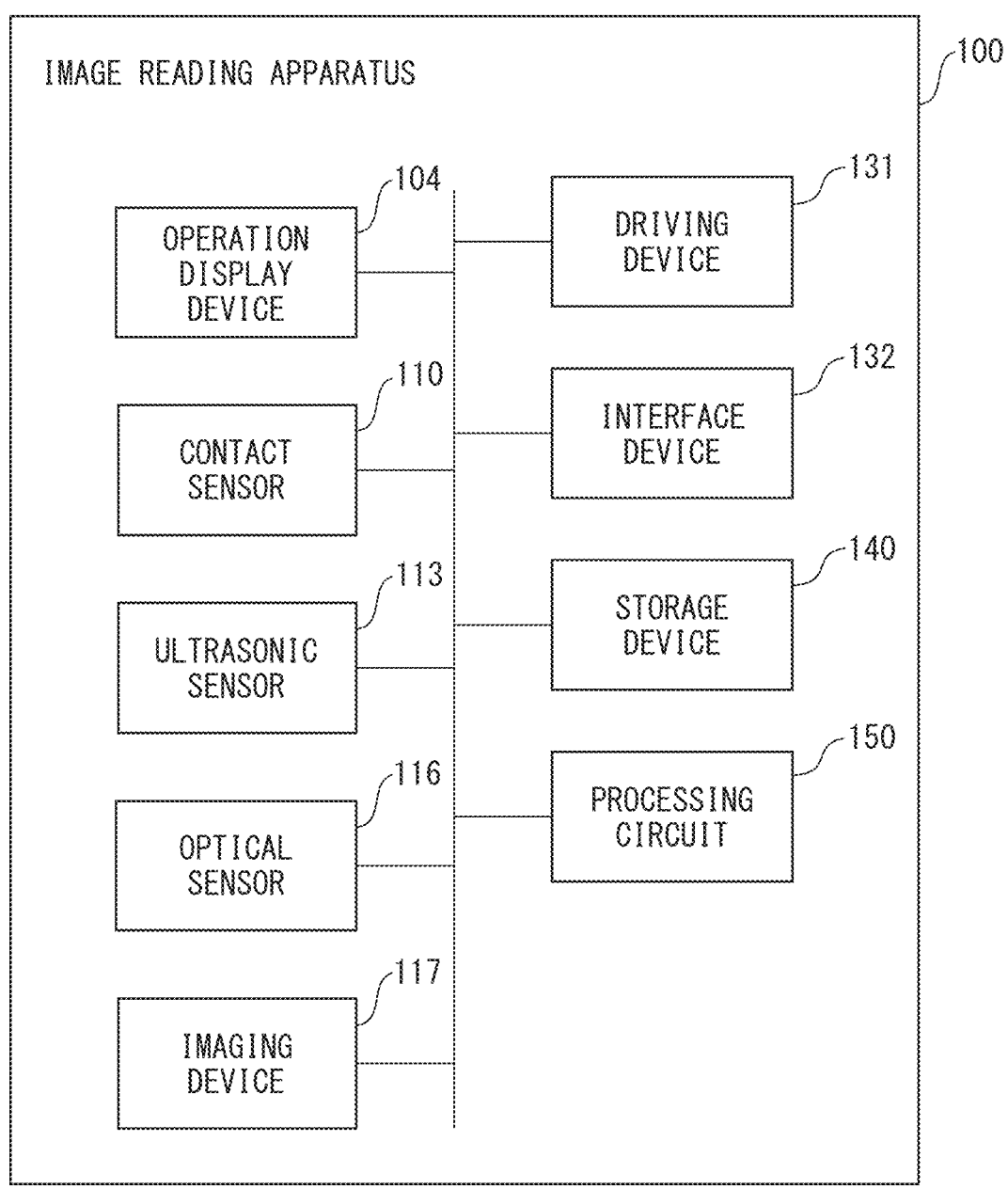
FIG. 4 is a block diagram illustrating a schematic configuration of the image reading apparatus 100.

FIG. 4 is a block diagram illustrating a schematic configuration of the image reading apparatus 100.

The image reading apparatus 100 further includes a driving device 131, an interface device 132, a storage device 140, and a processing circuit 150, etc., in addition to the configuration described above.

The driving device 131 includes a pulse generation circuit for generating a control pulse in accordance with a control signal from the processing circuit 150 and one or a plurality of motors. Each motor rotates in accordance with a control pulse generated by the pulse generation circuit and conveys a medium by rotating the separation rollers 111, the first conveyance rollers 114, the second conveyance rollers 115, the third conveyance rollers 118, and the fourth conveyance rollers 119.

For example, the interface device 132 includes an interface circuit conforming to a serial bus such as universal serial bus (USB), is electrically connected to an unillustrated information processing device (for example, a personal computer or a mobile information terminal), and transmits and receives an input image and various types of information. Further, a communication module including an antenna transmitting and receiving wireless signals, and a wireless communication interface device for transmitting and receiving signals through a wireless communication line in conformance with a predetermined communication protocol may be used in place of the interface device 32. For example, the predetermined communication protocol is a wireless local area network (LAN). The interface device 132 is an example of an output device.

The storage device 140 includes a memory device such as a random access memory (RAM) or a read only memory (ROM), a fixed disk device such as a hard disk, or a portable storage device such as a flexible disk or an optical disk. Further, the storage device 140 stores a computer program, a database, a table, etc., used for various types of processing in the image reading apparatus 100. The computer program may be installed on the storage device 140 from a computer-readable, non-transitory medium such as a compact disk read only memory (CD-ROM), a digital versatile disk read only memory (DVD-ROM), etc., by using a well-known setup program, etc.

For example, the processing circuit 150 is a processor, such as a central processing unit (CPU). The processing circuit 150 operates in accordance with a program previously stored in the storage device 150. The processing circuit 150 may be a digital signal processor (DSP), a large scale integration (LSI), an application specific integrated circuit (ASIC), a field-programmable gate array (FPGA), etc.

The processing circuit 150 is connected to the operation display device 104, the contact sensor 110, the ultrasonic sensor 113, the optical sensor 116, the imaging devices 117, the driving device 131, the interface device 132, the storage device 140, etc., and controls the modules. The processing circuit 150 performs drive control of the driving device 131, imaging control of the imaging devices 117, etc., acquires an image, and transmits the image to an unillustrated information processing device through the interface device 132. Further, the processing circuit 150 performs imaging control of the imaging devices 117 based on a signal generated by the ultrasonic sensor 113 and cuts out an image based on a signal generated by the optical sensor 116.

The processing circuit 150 executes predetermined image processing on an image imaged by the imaging device 117 and stores the image on which the image processing is executed into the storage device 140.

Figure 5:
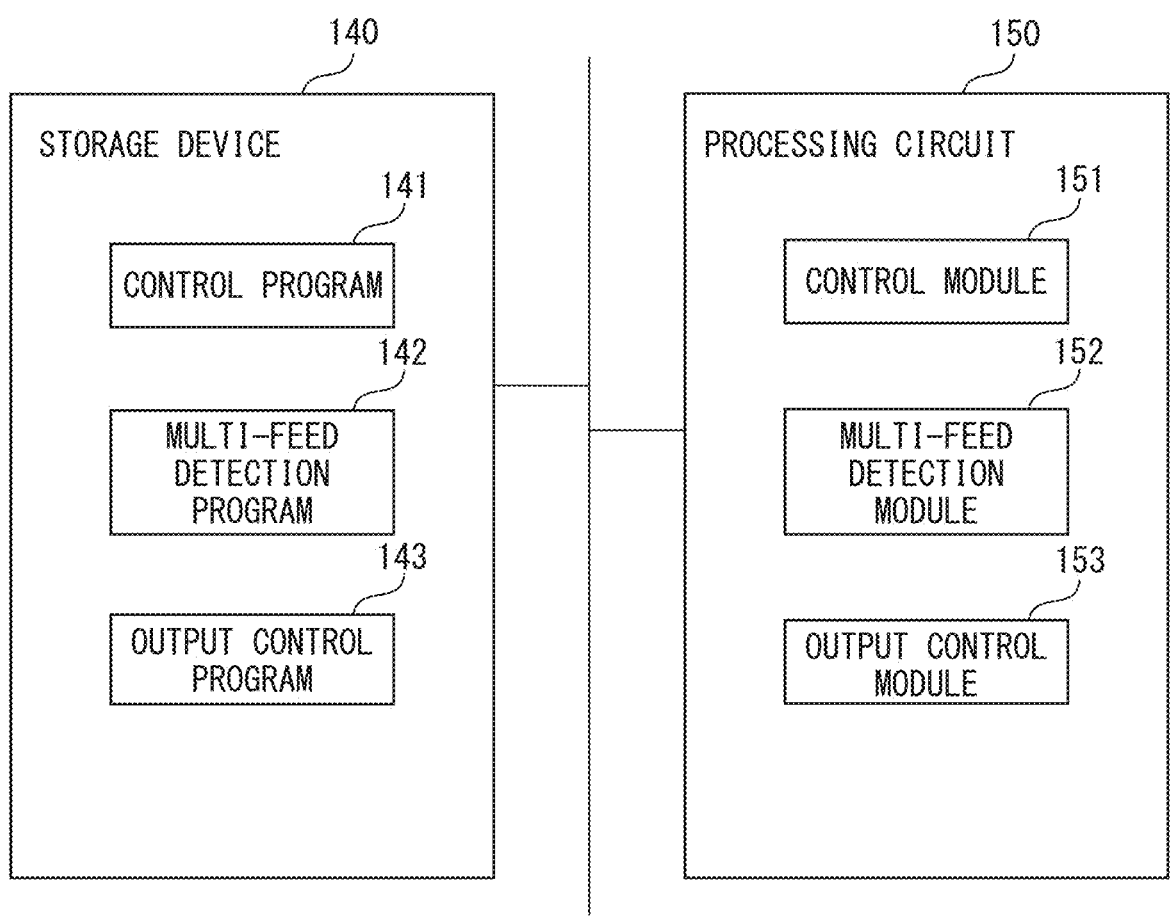
FIG. 5 is a diagram illustrating schematic configurations of a storage device 140 and a processing circuit 150.

FIG. 5 is a diagram illustrating schematic configurations of the storage device 140 and the processing circuit 150.

As illustrated in FIG. 5, the storage device 140 stores a control program 141, a multi-feed detection program 142, an output control program 143, etc. Each of these programs is a functional module implemented by software operating on a processor. The processing circuit 150 reads each program stored in the storage device 140 and operates in accordance with each read program. Consequently, the processing circuit 150 functions as a control module 151, a multi-feed detection module 152, and an output control module 153.

Figure 6:
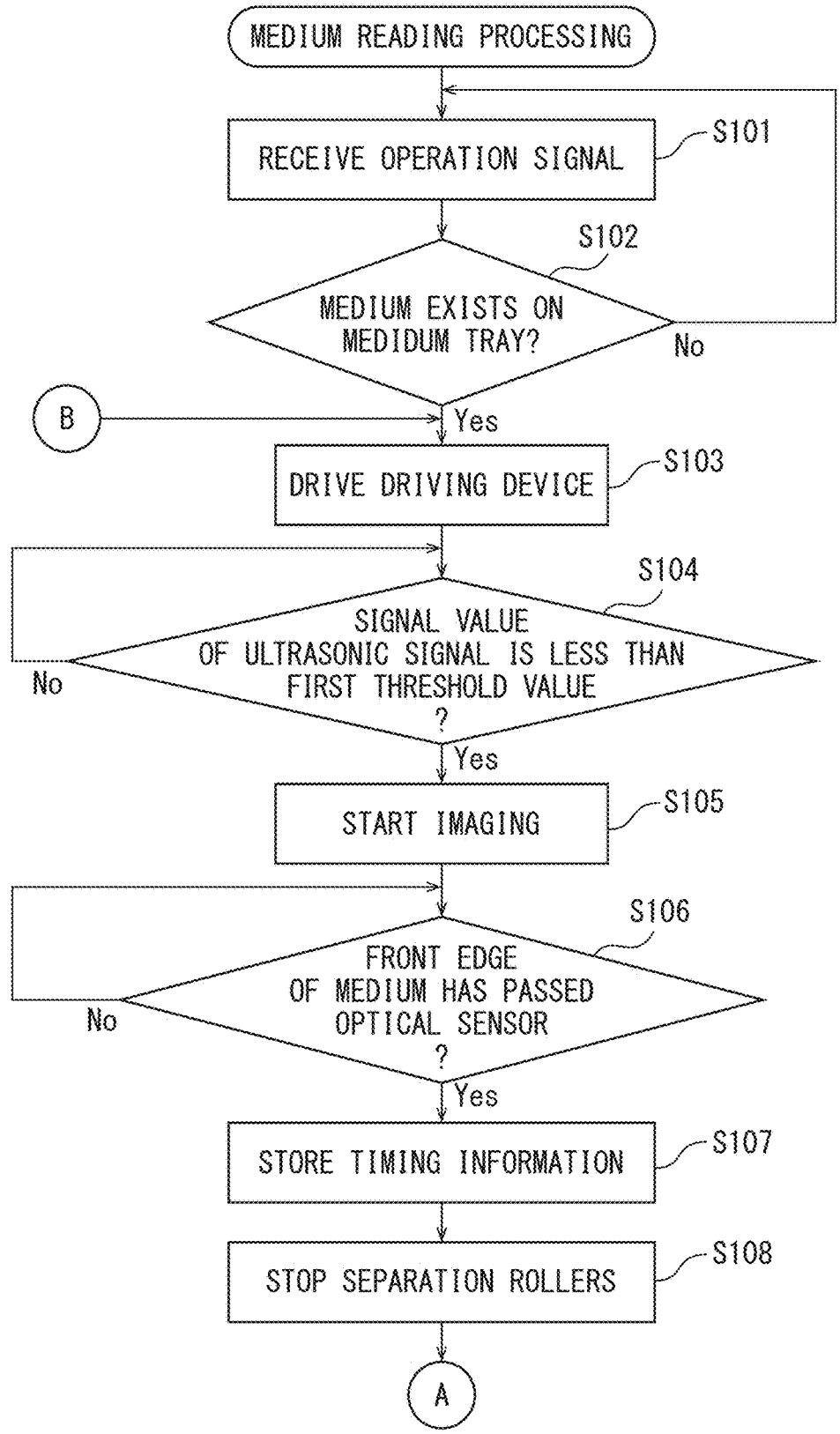
FIG. 6 is a flowchart illustrating an operation example of medium reading processing.
Figure 7:
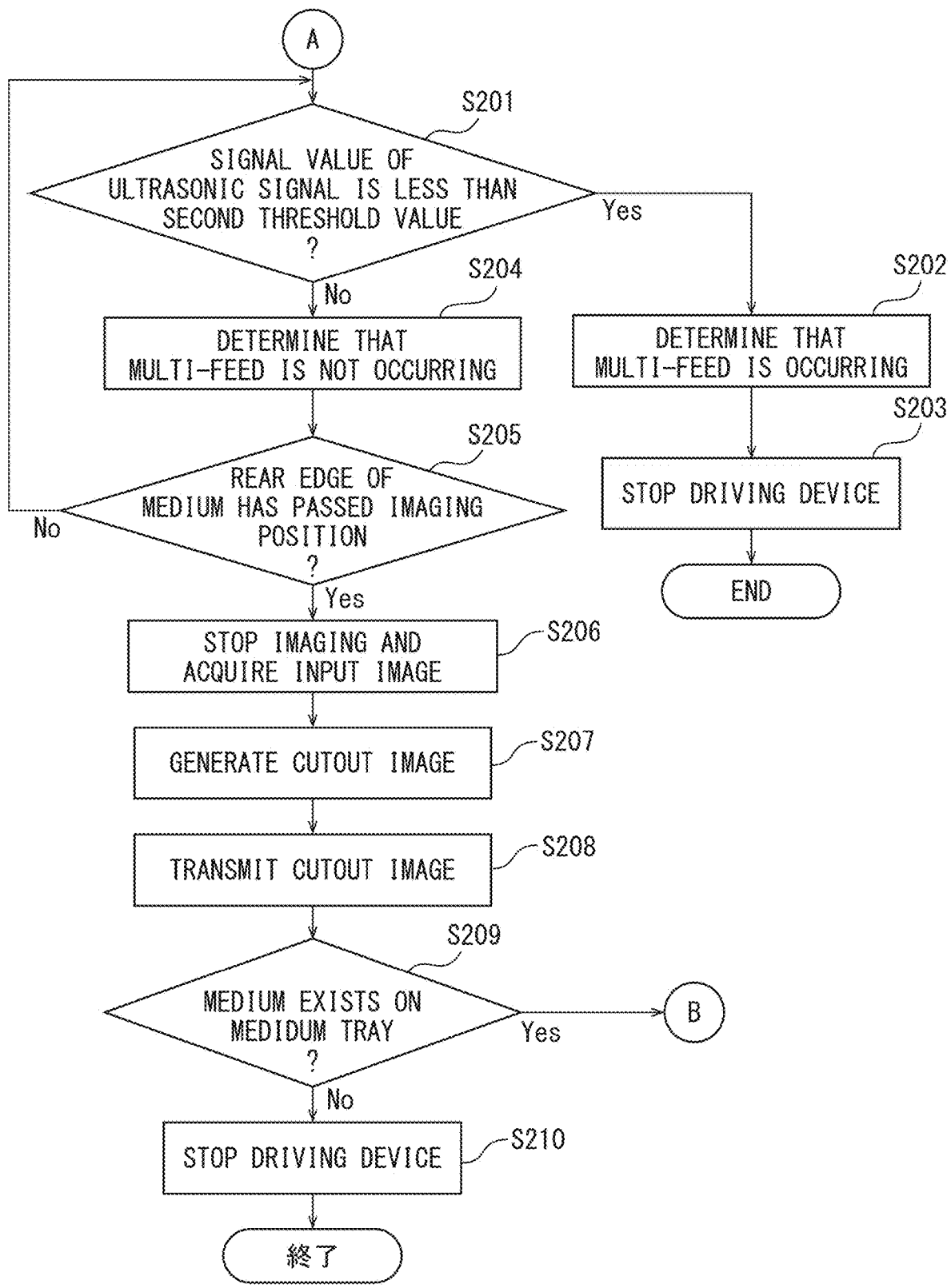
FIG. 7 is a flowchart illustrating the operation example of the medium reading processing.

FIG. 6 and FIG. 7 are a flowchart illustrating an operation example of medium reading processing in the image reading apparatus 100.

Referring to the flowchart illustrated in FIG. 6 and FIG. 7, an operation example of the medium reading processing in the image reading apparatus 100 will be described below. The operation flow described below is executed mainly by the processing circuit 150 in cooperation with each element in the image reading apparatus 100, in accordance with a program previously stored in the storage device 140. The operation flow illustrated in FIG. 6 and FIG. 7 is periodically executed.

First, the control module 151 stands by until an instruction to read a medium is input by a user by use of the operation display device 104, and an operation signal instructing to read the medium is received from the operation display device 104 (step S101).

Next, the control module 151 acquires a contact detection signal from the contact sensor 110 and determines whether or not a medium is placed on the medium tray 103, based on the acquired contact detection signal (step S102).

When a medium is not placed on the medium tray 103, the control module 151 returns the processing to step S101 and stands by until newly receiving an operation signal from the operation display device 104.

On the other hand, when a medium is placed on the medium tray 103, the control module 151 drives the driving device 131, rotates the separation rollers 111, and the first to fourth conveyance rollers 114, 115, 118, and 119, and feeds and conveys the medium (step S103). When already rotating the first to fourth conveyance rollers 114, 115, 118, and 119, the control module 151 drives the driving device 131 in such a way as to rotate the separation rollers 111.

Next, the multi-feed detection module 152 acquires an ultrasonic signal from the ultrasonic sensor 113, and determines whether or not a signal value of the acquired ultrasonic signal is less than a first threshold value (step S201).

Figure 8:
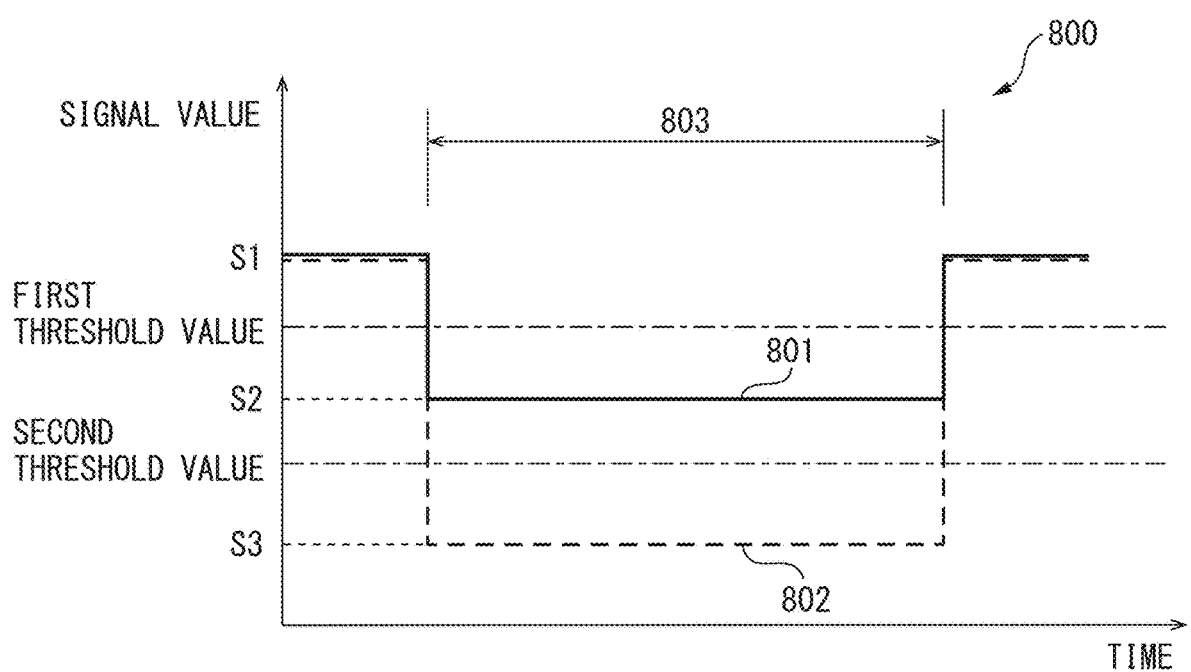
FIG. 8 is a schematic diagram for illustrating a characteristic of an ultrasonic signal.

FIG. 8 is a schematic diagram for illustrating a characteristic of an ultrasonic signal.

In a graph 800 in FIG. 8, the horizontal axis indicates time, and the vertical axis indicates a signal value of an ultrasonic signal. A solid line 801 represents a characteristic of an ultrasonic signal when one sheet of paper is conveyed as a medium, and a dotted line 802 represents a characteristic of an ultrasonic signal when multi-feed of paper is occurring. Further, a section 803 represents a period in which the medium passes over the ultrasonic sensor 113. A signal value of the ultrasonic signal in the solid line 801 declines in the section 803 due to the medium being conveyed at a position of the ultrasonic sensor 113. The first threshold value is set to a value between a signal value S1 of the ultrasonic signal when a medium is not conveyed and a signal value S2 of the ultrasonic signal when a sheet of paper is conveyed. The control module 151 can determine whether or not a medium exists at the position of the ultrasonic sensor 113 by determining whether or not a signal value of the ultrasonic signal is less than the first threshold value.

When a signal value of the ultrasonic signal is greater than or equal to the first threshold value, the control module 151 determines that the medium is not yet conveyed to the position of the ultrasonic sensor 113 and stands by. On the other hand, when a signal value of the ultrasonic signal is less than the first threshold value, the control module 151 determines that the medium is conveyed to the position of the ultrasonic sensor 113 and starts imaging by the imaging devices 117 (step S105). Thus, the control module 151 starts imaging by the imaging devices 117, in response to detection of a medium by the ultrasonic sensor 113.

Next, the control module 151 acquires an optical signal from the optical sensor 116 and determines whether or not the front edge of the medium has passed the position of the optical sensor 116, based on the acquired optical signal (step S106). The control module 151 determines that the front edge of the medium has passed the position of the optical sensor 116 when the signal value of the optical signal acquired immediately before indicates that a medium does not exist and also the signal value of the optical signal acquired this time indicates that a medium exists.

The control module 151 stands by until the front edge of the medium passes the position of the optical sensor 116 and when the front edge of the medium passes the position of the optical sensor 116, stores timing information relate to a timing at which the front edge of the medium passes the position of the optical sensor 116 (step S107). For example, the control module 151 stores, as timing information, the number of control pulses fed to the motor for rotating the conveyance roller pair in a period from the moment when the front edge of the medium passes the position of the ultrasonic sensor 113 to the moment when the front edge passes the position of the optical sensor 116.

Next, the control module 151 controls the driving device 131 in such a way as to stop rotation of the separation rollers 111 (step S108). The medium is thereafter conveyed by the first to fourth conveyance rollers 114, 115, 118, and 119.

Next, the control module 151 acquires an ultrasonic signal from the ultrasonic sensor 113 and determines whether or not the signal value of the acquired ultrasonic signal is less than a second threshold value (step S201). The second threshold value is set to a value smaller than the first threshold value.

In the graph 800 illustrated in FIG. 8, a signal value of the ultrasonic signal in the dotted line 802 declines in the section 803 due to occurrence of multi-feed. The second threshold value is set to a value between the signal value S2 of the ultrasonic signal when a sheet of paper is conveyed and a signal value S3 of the ultrasonic signal when multi-feed of paper is occurring. The multi-feed detection module 152 can determine whether or not multi-feed of media is occurring by determining whether or not a signal value of the ultrasonic signal is less than the second threshold value.

When a signal value of the ultrasonic signal is less than the second threshold value, the multi-feed detection module 152 determines that multi-feed is occurring (step S202). Thus, the multi-feed detection module 152 detects multi-feed of media based on an ultrasonic signal generated by the ultrasonic sensor 113.

Next, as abnormality processing, the control module 151 stops feed and conveyance of the medium by stopping the driving device 131 (step S203) and ends the series of steps. The control module 151 may notify a user of occurrence of abnormality by an unillustrated speaker, LED, etc., as the abnormality processing.

On the other hand, when a signal value of the ultrasonic signal is greater than or equal to the second threshold value, the control module 151 determines that multi-feed is not occurring (step S204).

Next, the control module 151 acquires an optical signal from the optical sensor 116 and determines whether or not the rear edge of the medium has passed the imaging position of the imaging devices 117, based on the acquired optical signal (step S205). The control module 151 determines that the rear edge of the medium has passed the position of the optical sensor 116 when the signal value of the optical signal acquired immediately before indicates that a medium exists and also the signal value of the optical signal acquired this time indicates that a medium does not exist. The control module 151 determines that the rear edge of the medium has passed the imaging position when a predetermined time elapses after the rear edge of the medium passes the position of the optical sensor 116. When not determining that the rear edge of the medium has passed the imaging position, the control module 151 returns the processing to step S201 and repeats the processing in steps S201 to S204.

On the other hand, when determining that the rear edge of the medium has passed the imaging position, the control module 151 ends imaging by the imaging devices 117 and acquires an input image from the imaging devices 117 (step S206).

Next, in response to detection of the medium by the optical sensor 116, the control module 151 generates a cutout image in which a medium region including at least the medium is cut out from the input image (step S207).

The control module 151 generates the cutout image based on a position imaged by a predetermined amount before a position imaged at a timing when the medium passes the optical sensor 116, that is, a timing when the optical sensor 116 detects the medium, in the input image. The control module 151 generates the cutout image by using, as a reference position, a position imaged by a predetermined amount before a position imaged at a timing when the optical sensor 116 detects the medium, in the input image.

Figure 9A:
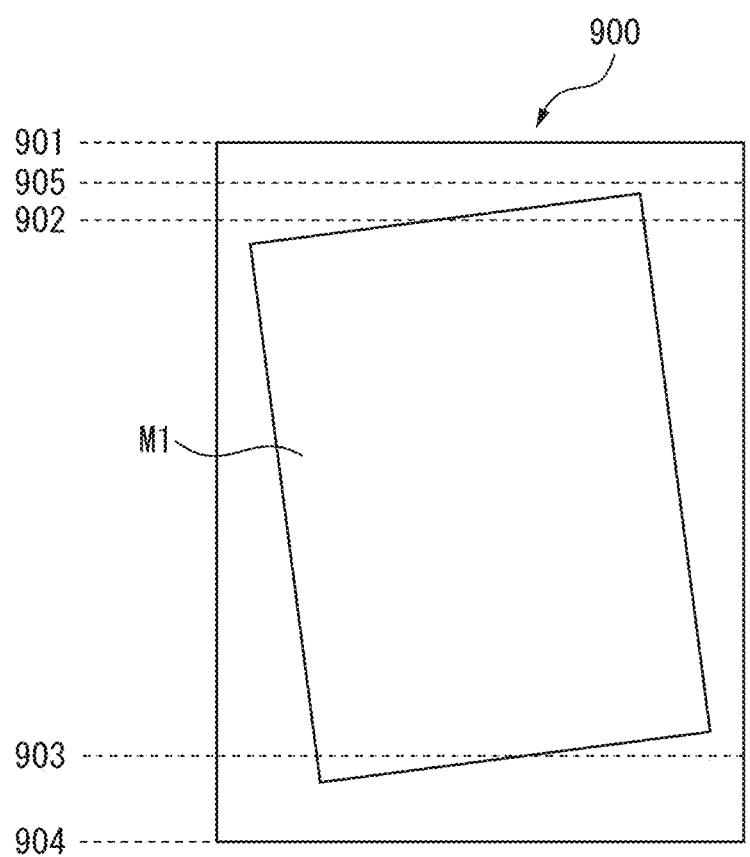
FIG. 9A is a schematic diagram for illustrating a cutout image.

FIG. 9A is a schematic diagram for illustrating the cutout image.

FIG. 9A illustrates an input image 900 in which a medium M1 conveyed in a tilted manner is imaged. In the input image 900, a position 901 is a position imaged at a timing when the front edge of the medium M1 passes the position of the ultrasonic sensor 113, and a position 902 is a position imaged at a timing when the front edge of the medium M1 passes the position of the optical sensor 116. Further, a position 903 is a position imaged at a timing when the rear edge of the medium M1 passes the position of the optical sensor 116, and a position 904 is a position imaged at a timing when a predetermined time elapses after the rear edge of the medium M1 passes the position of the optical sensor 116.

As described above, when a maximum size of a medium supported by the image reading apparatus 100 in the width direction A2 is denoted as $X_{MAX}$, and a permissible amount of tilt of a medium is denoted as $\theta_{MAX}$, the maximum value of an amount of deviation of the front edge of a medium in the medium conveying direction A1 is ($X_{MAX} \sin \theta_{MAX}$). The control module 151 generates the cutout image by using, as a reference position, a position 905 positioned on the upper side of (imaged earlier than) the position 902 imaged at the timing when the front edge of the medium M1 passes the optical sensor 116, by a pixel count corresponding to the aforementioned maximum value of an amount of deviation, in the input image.

Further, as described above, the driving device 131 causes the conveyance roller pair to convey a medium by rotating the motor in accordance with a control pulse, and the imaging devices 117 image lines extending in a main scanning direction of the medium, in accordance with the control pulse. Accordingly, by use of the control pulse rotating the motor, the control module 151 can specify the position 902 imaged at the timing when the front edge of the medium passes the optical sensor 116 and the position 905 positioned on the upper side by the pixel count corresponding to the maximum value of an amount of deviation. The control module 151 specifies, as the position 902, a position positioned on the lower side of (imaged later than) the front edge position of the input image by a pixel count corresponding to the number of control pulses stored as timing information in step S107. Further, the control module 151 specifies, as the position 905, a position positioned on the upper side of (imaged earlier than) the specified position 902 by a pixel count corresponding to the number of control pulses causing the conveyance roller pair to move the medium by the maximum value of an amount of deviation.

Then, the control module 151 generates the cutout image by cutting out a region from the specified position 905 to the rear edge position 904, from the input image 900.

Thus, the control module 151 specifies a pixel count corresponding to the maximum value of an amount of deviation by use of a control pulse rotating the motor. Consequently, the control module 151 can easily and accurately determine a position where an image is cut out from an input image. Further, the control module 151 specifies the pixel count corresponding to the maximum value of an amount of deviation based on a permissible amount of tilt of a medium determined for the image reading apparatus. Consequently, even when a medium is conveyed in a tilted manner, the control module 151 can determine a position where an image is cut out from an input image in such a way that the entire medium is reliably included.

Next, the output control module 153 outputs the generated cutout image by transmitting the cutout image to the unillustrated information processing device through the interface device 132 (step S208).

Next, the control module 151 determines whether or not a medium remains on the medium tray 103 based on a contact detection signal acquired from the contact sensor 110 (step S209). When a medium remains on the medium tray 103, the control module 151 returns the processing to step S103 and executes the processing in steps S103 to S209 on a next medium.

On the other hand, when no medium remains on the medium tray 103, the control module 151 stops the driving device 131 (step S210) and ends the series of steps.

The processing in steps S201 to S203 may be executed after feed of the medium starts (in or after step S104) or after the front edge of the medium passes the position of the ultrasonic sensor 113 (in or after step S105) instead of after the front edge of the medium passes the position of the optical sensor 116. Further, the processing in steps S201 to S203 may be omitted. In that case, as a sensor detecting a medium and being located between the separation rollers 111 and the conveyance roller pair, an optical sensor similar to the optical sensor 116 or a contact sensor similar to the contact sensor 110 may be used in place of the ultrasonic sensor 113. The control module 151 determines whether or not the medium is conveyed to the position of the optical sensor or the contact sensor based on a signal generated by the sensor, in step S104, and starts imaging by the imaging devices 117 based on the determination result, in step S105.

A technical meaning of starting imaging based on a detection result of the ultrasonic sensor 113 and cutting out an image based on a detection result of the optical sensor 116 will be described below.

As illustrated in FIG. 3, in the small-sized image reading apparatus 100 with a small space between the conveyance roller pair and the imaging devices 117, when a medium M is conveyed in a tilted manner, a part E of the front edge of the medium may reach the imaging position L2 before the front edge passes the optical sensor 116. In the example illustrated in FIG. 3, in spite of the medium M being clamped across the full width in the width direction A2 by the conveyance roller pair, the part E of the front edge of the medium reaches the imaging position L2 before the front edge passes the optical sensor 116.

In such a small-sized image reading apparatus 100, when the optical sensor 116 being located on the downstream side of the conveyance roller pair and detecting that a medium passes a nip range thereof detects a medium, part of the medium may have already passed the imaging position L2. Accordingly, when imaging by the imaging devices 117 is started based on a detection result of the optical sensor 116, part of the medium may not be imaged and an imaged input image may not include the entire medium. On the other hand, the image reading apparatus 100 can reliably image an entire medium even when the medium is conveyed in a tilted manner, by starting imaging by the imaging devices 117 based on of a detection result of the ultrasonic sensor 113 located on the upstream side of the conveyance roller pair.

In the aforementioned input image 900 in FIG. 9A, the position 901 is a position imaged at the timing when the front edge of the medium M1 passes the position of the ultrasonic sensor 113, and the position 902 is a position imaged at the timing when the front edge of the medium M1 passes the position of the optical sensor 116. Accordingly, when imaging is started at the timing when the front edge of a medium passes the position of the optical sensor 116, part of the front edge of the medium is not imaged and is not included in an input image. On the other hand, in the input image 900, imaging is started at the timing when the front edge of a medium passes the position of the ultrasonic sensor 113, and therefore the entire medium is imaged and is included in an input image.

However, by starting imaging by the imaging devices 117 before a medium passes the conveyance roller pair, an input image includes a large blank part in which the medium is not imaged when a slip of the medium occurs at conveyance by the separation rollers 111 or the conveyance roller pair. A medium is clamped only by the separation rollers 111 and the separation pads 112 before passing the conveyance roller pair, and therefore a slip is particularly likely to occur.

Figure 9B:
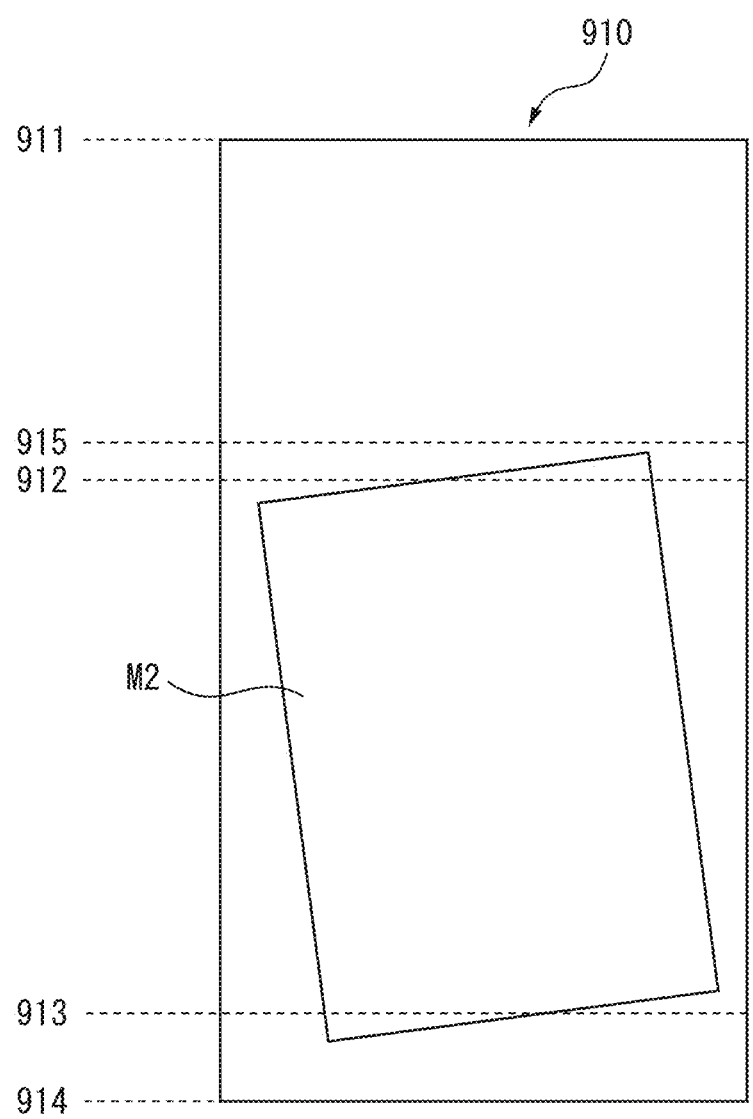
FIG. 9B is a schematic diagram for illustrating a slip of a medium.

FIG. 9B is a schematic diagram for illustrating a slip of a medium.

FIG. 9B illustrates an input image 910 in which a medium M2 being conveyed while slipping at the separation rollers 111 or the conveyance roller pair is imaged. In the input image 910, a position 911 is a position where the front edge of the medium M2 is imaged at a timing when the front edge passes the position of the ultrasonic sensor 113, and a position 912 is a position where the front edge of the medium M2 is imaged at a timing when the front edge passes the position of the optical sensor 116. Further, a position 913 is a position where the rear edge of the medium M2 is imaged at a timing when the rear edge passes the position of the optical sensor 116, and a position 914 is a position where the rear edge of the medium M2 is imaged at a timing when a predetermined time elapses after the rear edge passes the position of the optical sensor 116.

In this example, a slip occurs after the front edge of the medium M2 passes the position of the ultrasonic sensor 113. Consequently, there is a large blank part in the input image 910 between the position 911 imaged at the timing when the front edge of the medium M2 passes the position of the ultrasonic sensor 113 and the position 912 imaged at the timing when the front edge of the medium M2 passes the position of the optical sensor 116. However, in the input image 910, only a region on the lower side of a position 915 positioned on the upper side of the position 912 by a predetermined amount is cut out as a cutout image, the position 912 being imaged at the timing when the front edge of the medium M2 passes the optical sensor 116, and therefore the blank part is suitably deleted in the cutout image.

Thus, the image reading apparatus 100 cuts out an image based on a detection result of the optical sensor 116 located on the downstream side of the conveyance roller pair, and therefore excessive increase in a size of an image in which a medium is imaged is suppressed.

As described in detail above, the image reading apparatus 100 starts imaging based on a detection position of a medium by the ultrasonic sensor 113 and generates the cutout image from a position imaged a little amount before the detection position of the medium by the optical sensor 116. Consequently, the image reading apparatus 100 can cut out an image in such a way that a lacking part does not exit and also a surplus part is minimized, even when a skew or a slip occurs during conveyance of a medium. Accordingly, the image reading apparatus 100 can more reliably image an entire medium while suppressing excessive increase in a size of an image in which the medium is imaged.

Consequently, the image reading apparatus 100 can suppress increase in a processing load when performing image processing such as character detection on an imaged image. Further, the image reading apparatus 100 cuts out an image without detecting a medium region by image processing and therefore suppresses cutting out of an erroneous region due to a detection error of a medium region, etc.

Further, the optical sensor 116 and the imaging devices 117 do not need to be separated in order to image an entire medium in the image reading apparatus 100, and therefore downsizing of the device can be achieved. Further, under the technology according to the present embodiment, an imaging start timing is determined by use of an ultrasonic sensor included in a common medium conveying device, and therefore the technology according to the present embodiment is applicable to a medium conveying device already shipped as a product, merely by updating a control program.

Further, in general, diameters of the ultrasonic transmitter 113a and the ultrasonic receiver 113b are large, and therefore detection precision of a medium passage time by the ultrasonic sensor 113 is low, and diameters of the light emitter 116a and the light receiver 116b are small, and therefore detection precision of a medium passage time by the optical sensor 116 is high. The image reading apparatus 100 cuts out a medium region from an input image by use of the optical sensor 116 with high detection precision of a medium passage time and therefore can more suitably cut out a medium region.

Figure 10:
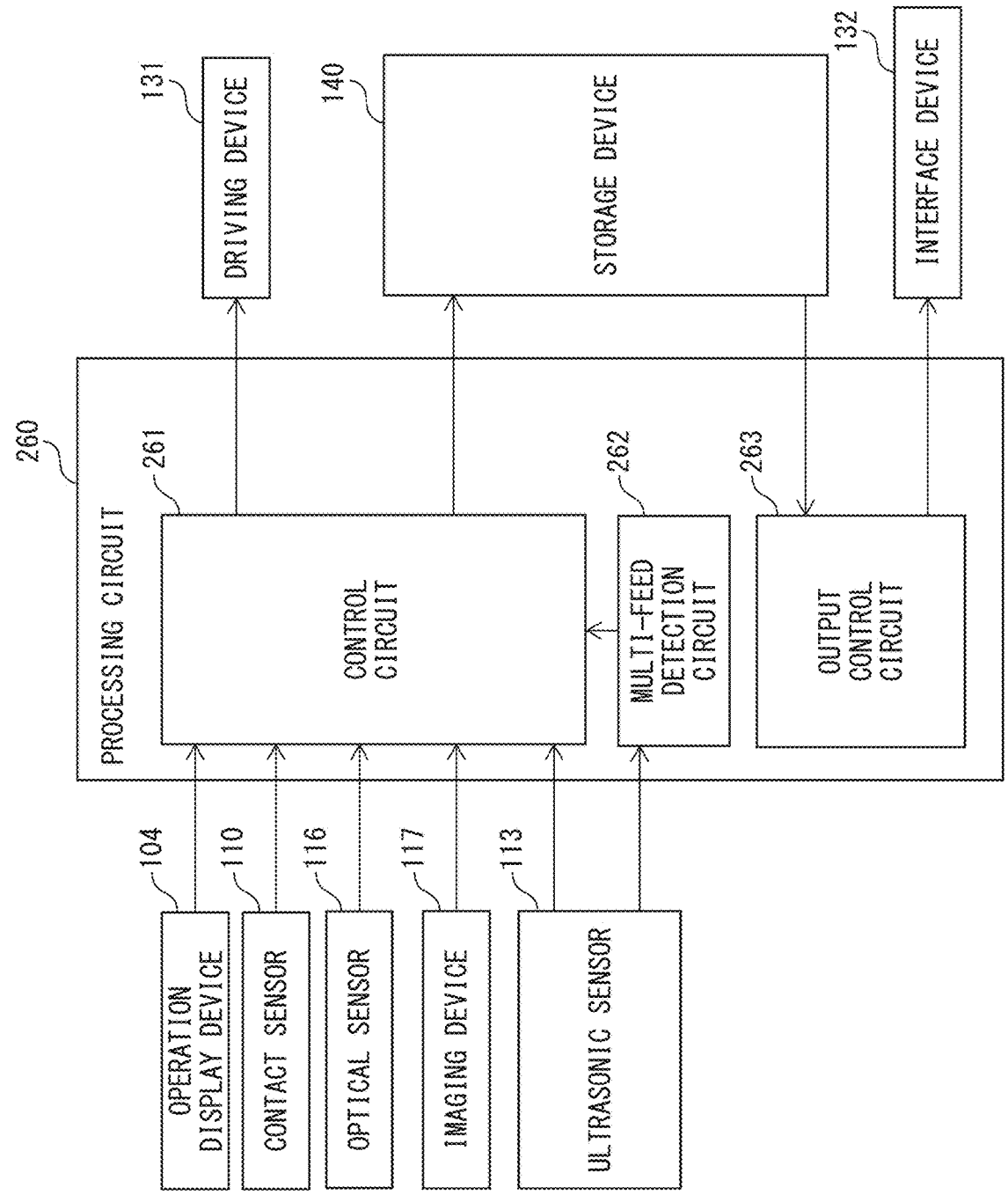
FIG. 10 is a diagram illustrating a schematic configuration of a processing circuit 260 in another image reading apparatus.
Figure 6:
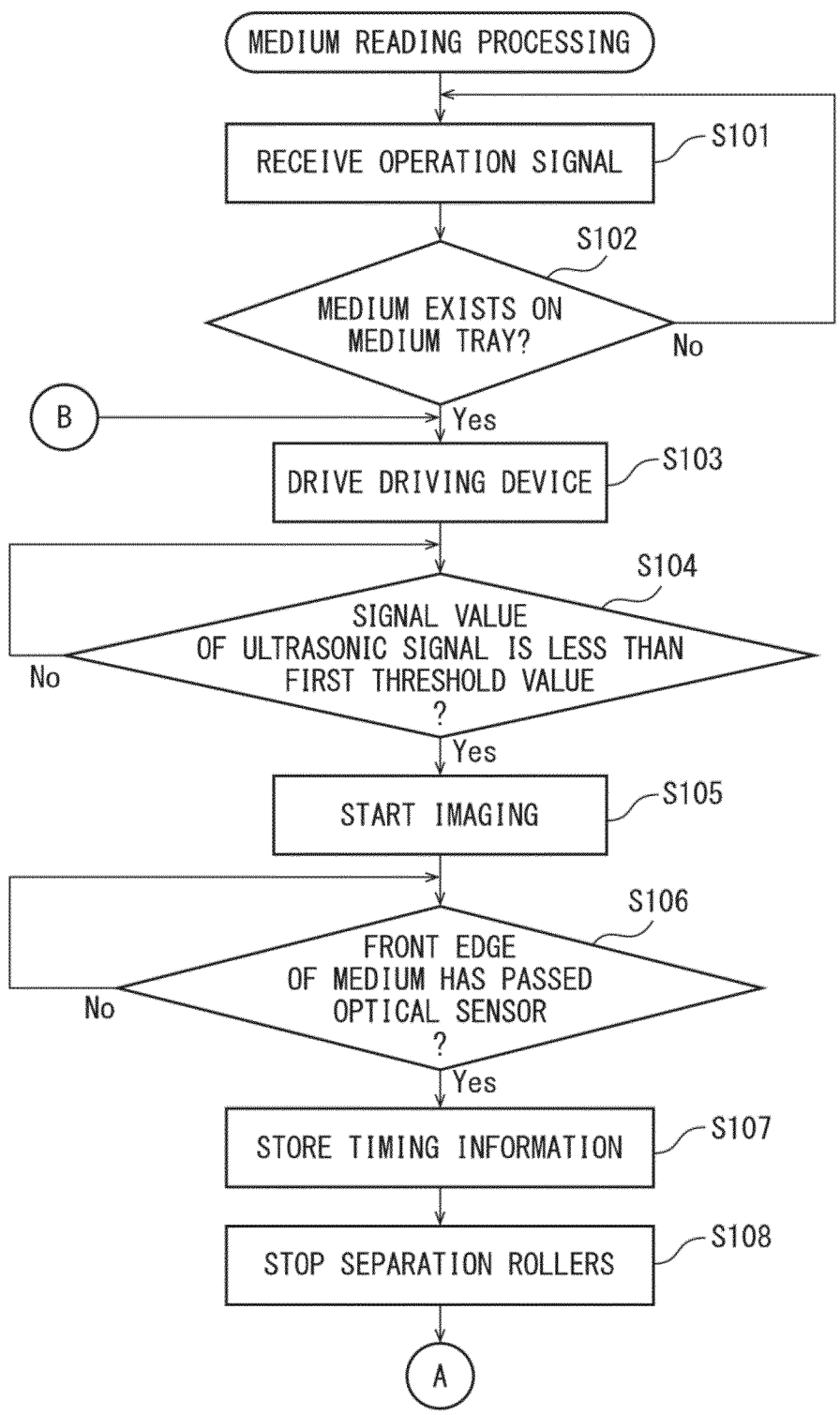

FIG. 10 is a diagram illustrating a schematic configuration of a processing circuit 260 in an image reading apparatus according to another embodiment. The processing circuit 260 is used in place of the processing circuit 150 in the image reading apparatus 100 and executes the medium reading processing in place of the processing circuit 150. The processing circuit 260 includes a control circuit 261, a multi-teed detection circuit 262, and an output control circuit 263. Each of the modules may be configured with an independent integrated circuit, microprocessor, firmware, etc.

The control circuit 261 is an example of a control module and has a function similar to that of the control module 151. The control circuit 261 receives an operation signal from an operation display device 104, a contact detection signal from a contact sensor 110, an ultrasonic signal from an ultrasonic sensor 113, an optical signal from an optical sensor 116, an input image from an imaging device 117, and a multi-feed detection result from the multi-feed detection circuit 262. Based on the received signals, the control circuit 261 drives a driving device 131, and also generates a cutout image from the input image and stores the image into a storage device 140.

The multi-feed detection circuit 262 is an example of a multi-feed detection module and has a function similar to that of the multi-feed detection module 152. The multi-feed detection circuit 262 receives an ultrasonic signal from the ultrasonic sensor 113, detects multi-feed of media based on the ultrasonic signal, and outputs the detection result to the control circuit 261.

The output control circuit 263 is an example of an output control module and has a function similar to that of the output control module 153. The output control circuit 263 reads the cutout image from the storage device 140 and transmits the image to an information processing device through an interface device 132.

As described in detail above, even when using the processing circuit 260, the image reading apparatus can more reliably image an entire medium while suppressing excessive increase in a size of an image in which the medium is imaged.

According to some embodiments, an image reading apparatus, a method for generating a cutout image, and the computer-readable, non-transitory medium storing the control program can more reliably image an entire medium while suppressing excessive increase in a size of an image in which the medium is imaged.

All examples and conditional language recited herein are intended for pedagogical purposes to aid the reader in understanding the invention and the concepts contributed by the inventor to furthering the art, and are to be construed as

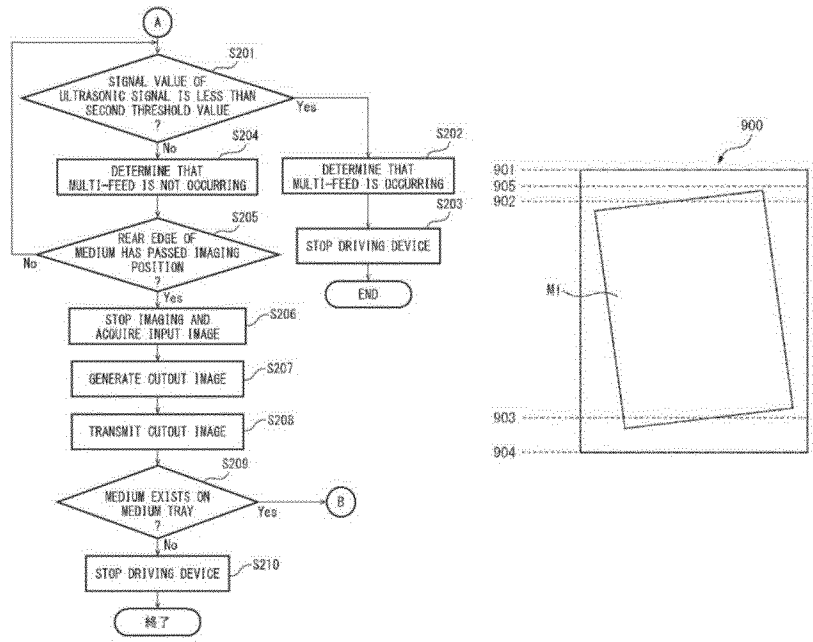

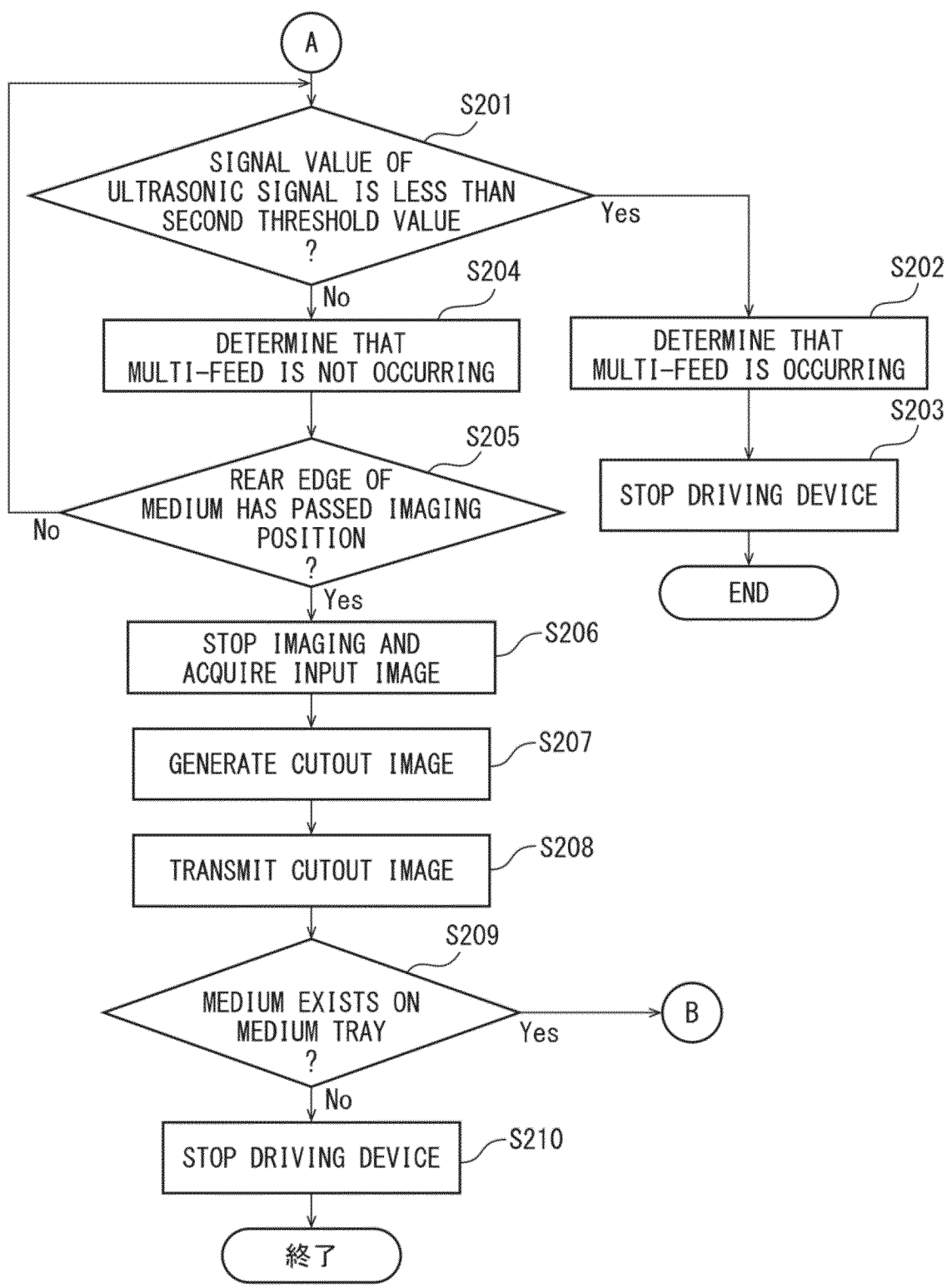

What is claimed is:

1. An image reading apparatus comprising:
a separation roller to separate a medium;
an imaging sensor to image the medium to generate an input image;
a conveyance roller to convey the medium separated by the separation roller to the imaging sensor;
a first medium sensor located between the separation roller and the conveyance roller;
a second medium sensor located between the conveyance roller and the imaging sensor;
a processor to determine whether a front edge of the medium reaches a position of the first medium sensor and to start imaging by the imaging sensor, when the processor determines that the front edge of the medium reaches the location of the first medium sensor and generate a cutout image from the input image after detection of a rear edge of the medium by the second medium sensor; and
an interface circuit to output the cutout image, wherein
the processor generates the cutout image by cutting out a region from a position imaged by a predetermined time period before a position imaged at a time after the second medium sensor detects the rear edge of the medium, in the input image.

2. The image reading apparatus according to claim 1, wherein
the first medium sensor includes an ultrasonic transmitter to transmit an ultrasonic wave and an ultrasonic receiver located to face the ultrasonic transmitter to generate an ultrasonic signal based on a received ultrasonic wave, and wherein
the processor detects multi-feed of media based on the ultrasonic signal.

3. The image reading apparatus according to claim 1, further comprising
a motor to rotate the conveyance roller in accordance with a control pulse, wherein
the processor specifies the predetermined time period by use of the control pulse.

4. The image reading apparatus according to claim 1, wherein the processor specifies the predetermined time period based on a permissible amount of tilt of a medium determined for the image reading apparatus.

5. A method for generating a cutout image, comprising:
separating a medium by a separation roller;
conveying the medium separated by the separation roller to an imaging sensor by a conveyance roller;
determining whether a front edge of the medium reaches a position of a first medium sensor located between the separation roller and the conveyance roller;
starting imaging the medium to generate an input image by the imaging sensor when it is determined that the front edge of the medium reaches the position of the first medium sensor;
generating a cutout image from the input image after detection of a rear edge of the medium by the second medium sensor located between the conveyance roller and the imaging sensor; and
outputting the cutout image by an interface circuit, wherein
the cutout image is generated by cutting out a region from a position imaged by a predetermined time period before a position imaged at a time after the second medium sensor detects the rear edge of the medium, in the input image.

6. The method according to claim 5, wherein
the first medium sensor includes an ultrasonic transmitter to transmit an ultrasonic wave and an ultrasonic receiver located to face the ultrasonic transmitter to generate an ultrasonic signal based on a received ultrasonic wave, further comprising
detecting multi-feed of media based on the ultrasonic signal.

7. The method according to claim 5, further comprising specifying the predetermined time period by use of a control pulse wherein a motor rotates the conveyance roller in accordance with the control pulse.

8. The method according to claim 5, further comprising specifying the predetermined time period based on a permissible amount of tilt of a medium determined for an image reading apparatus.

9. A computer-readable, non-transitory medium storing a computer program, wherein the computer program causes an image reading apparatus including a separation roller to separate a medium, an imaging sensor to image the medium to generate an input image, a conveyance roller to convey the medium separated by the separation roller to the imaging sensor, a first medium sensor located between the separation roller and the conveyance roller, a second medium sensor located between the conveyance roller and the imaging sensor, to execute a process, the process comprising:
determining whether a front edge of the medium reaches a position of the first medium sensor;
starting imaging by the sensor when it is determined that the front edge of the medium reaches the position of the first medium sensor and generating a cutout image from the input image after detection of the medium by the second medium sensor; and
outputting the cutout image, wherein
the cutout image is generated by cutting out a region from a position imaged by a predetermined time period before a position imaged at a time after the second medium sensor detects the rear edge of the medium, in the input image.

10. The computer-readable, non-transitory medium according to claim 9, wherein
the first medium sensor includes an ultrasonic transmitter to transmit an ultrasonic wave and an ultrasonic receiver located to face the ultrasonic transmitter to generate an ultrasonic signal based on a received ultrasonic wave, further comprising
detecting multi-feed of media based on the ultrasonic signal.

11. The computer-readable, non-transitory medium according to claim 9, wherein
the image reading apparatus further includes a motor to rotate the conveyance roller in accordance with a control pulse, further comprising
specifying the predetermined time period by use of the control pulse.

12. The computer-readable, non-transitory medium according to claim 9, further comprising specifying the predetermined time period based on a permissible amount of tilt of a medium determined for the image reading apparatus.

* * * * *

UNITED STATES PATENT AND TRADEMARK OFFICE
CERTIFICATE OF CORRECTION

PATENT NO. : 11,283,953 B2
APPLICATION NO. : 16/854727
DATED : March 22, 2022
INVENTOR(S) : Tomohiro Murakami et al.

It is certified that error appears in the above-identified patent and that said Letters Patent is hereby corrected as shown below:

On the Title Page

Please delete the Title Page and insert the Title Page showing the illustrative figure shown on the attached Title Page.

In the Drawings

Please replace Fig. 6 with Fig. 6 as shown on the attached page.

Please replace Fig. 7 with Fig. 7 as shown on the attached page.

In the Claims

Column 16, Line 41, Claim 9 After "of", insert -- a rear edge of --.

Signed and Sealed this
Sixth Day of June, 2023

Katherine Kelly Vidal
*Director of the United States Patent and Trademark Office*

(12) United States Patent
Murakami et al.

(10) Patent No.: US 11,283,953 B2
(45) Date of Patent: Mar. 22, 2022

(54) IMAGE READING APPARATUS FOR GENERATING A CUTOUT IMAGE FROM INPUT IMAGE

(71) Applicant: PFU LIMITED, Kahoku (JP)

(72) Inventors: Tomohiro Murakami, Kahoku (JP); Hiroyuki Kitano, Kahoku (JP)

(73) Assignee: PFU LIMITED, Kahoku (JP)

( * ) Notice: Subject to any disclaimer, the term of this patent is extended or adjusted under 35 U.S.C. 154(b) by 0 days.

(21) Appl. No.: 16/854,727

(22) Filed: Apr. 21, 2020

(65) Prior Publication Data
US 2020/0382671 A1    Dec. 3, 2020

(30) Foreign Application Priority Data

May 31, 2019   (JP) .................. JP2019-102760

(51) Int. Cl.
*H04N 1/00*      (2006.01)
*G06F 3/12*      (2006.01)

(52) U.S. Cl.
CPC ..... *H04N 1/00718* (2013.01); *H04N 1/00705* (2013.01); *H04N 1/00729* (2013.01); *H04N 1/00745* (2013.01)

(58) Field of Classification Search
CPC .......... H04N 1/00705; H04N 1/00718; H04N 1/00729; H04N 1/00745; H04N 1/00628; H04N 1/3878
USPC ............ 358/1.2, 488, 448, 464, 463, 462; 382/289, 286
See application file for complete search history.

(56) References Cited

U.S. PATENT DOCUMENTS

| | | | | |
|---|---|---|---|---|
| 9,848,104 B1* | 12/2017 | Wada | ............... | H04N 1/00718 |
| 2011/0279840 A1* | 11/2011 | Iwayama | ............ | H04N 1/00588 |
| | | | | 358/1.12 |
| 2013/0083366 A1* | 4/2013 | Motoyama | ........ | H04N 1/00745 |
| | | | | 358/448 |
| 2014/0078558 A1* | 3/2014 | Kanaya | ............. | H04N 1/00005 |
| | | | | 358/448 |
| 2014/0079460 A1* | 3/2014 | Kanaya | ................ | H04N 1/04 |
| | | | | 400/583 |

FOREIGN PATENT DOCUMENTS

| | | |
|---|---|---|
| JP | 2008-214046 A | 9/2008 |
| JP | 2013-77953 A | 4/2013 |

* cited by examiner

*Primary Examiner* — Chad Dickerson
(74) *Attorney, Agent, or Firm* — Lewis Roca Rothgerber Christie LLP

(57) ABSTRACT

The image reading apparatus includes a separation roller, an imaging device to generate an input image, a conveyance roller to convey the medium separated by the separation roller to the imaging device, a first medium sensor located between the separation roller and the conveyance roller, a second medium sensor located between the conveyance roller and the imaging device, a processor to start imaging by the imaging device in response to detection of the medium by the first medium sensor and generate a cutout image from the input image in response to detection of the medium by the second medium sensor, and an output device to output the cutout image. The processor generates the cutout image based on a position imaged by a predetermined amount before a position imaged at a timing when the second medium sensor detects the medium, in the input image.

12 Claims, 11 Drawing Sheets